US009536069B1

(12) United States Patent
Shah et al.

(10) Patent No.: US 9,536,069 B1
(45) Date of Patent: Jan. 3, 2017

(54) METHOD OF USING TEXT AND PICTURE FORMATTING OPTIONS AS PART OF CREDENTIALS FOR USER AUTHENTICATION, AS A PART OF ELECTRONIC SIGNATURE AND AS A PART OF CHALLENGE FOR USER VERIFICATION

(71) Applicant: Dhavalkumar Shah, Parlin, NJ (US)

(72) Inventors: Dhavalkumar Shah, Parlin, NJ (US); Nehal Mehta, Parlin, NJ (US)

(73) Assignee: Dhavalkumar Shah, Old Bridge, NJ (US)

( * ) Notice: Subject to any disclaimer, the term of this patent is extended or adjusted under 35 U.S.C. 154(b) by 0 days.

(21) Appl. No.: 14/839,162

(22) Filed: Aug. 28, 2015

(51) Int. Cl.
| G06F 21/31 | (2013.01) |
| G06F 17/21 | (2006.01) |
| G06F 21/36 | (2013.01) |
| H04L 29/06 | (2006.01) |
| G06F 21/45 | (2013.01) |

(52) U.S. Cl.
CPC ............. *G06F 21/31* (2013.01); *G06F 17/214* (2013.01); *G06F 21/36* (2013.01); *G06F 21/45* (2013.01); *H04L 63/08* (2013.01); *H04L 63/083* (2013.01)

(58) Field of Classification Search
CPC ........ G06F 21/36; G06F 21/31; H04L 63/083; H04L 63/18
See application file for complete search history.

(56) References Cited

U.S. PATENT DOCUMENTS

| 7,844,825 | B1 * | 11/2010 | Neginsky | ................ G06F 21/83 713/184 |
| 8,601,538 | B2 * | 12/2013 | Qvarfordt | ............... G06F 21/36 382/181 |
| 8,621,396 | B1 * | 12/2013 | Gossweiler, III | ..... G06F 3/0488 713/183 |
| 2003/0172281 | A1 * | 9/2003 | Lee | ........................ G06F 21/46 713/183 |
| 2007/0030963 | A1 * | 2/2007 | Wyld | ...................... G06F 3/038 380/44 |
| 2007/0214251 | A1 * | 9/2007 | Li | ....................... H04L 67/2814 709/223 |
| 2007/0250920 | A1 * | 10/2007 | Lindsay | .................. G06F 21/31 726/7 |

(Continued)

*Primary Examiner* — James Turchen
(74) *Attorney, Agent, or Firm* — Dhavalkumar Shah

(57) ABSTRACT

We propose a method that uses formatting options of Font, Font Size, Font Color, Shading, Font Style, Font Effects, Font Underline, Character Effects, Picture coloring, as a part of user passwords, credentials, electronic signature, challenge for user authentication and captcha verification. User personalizes user name and or password or text by choosing combination of proposed factors for each character or word in password. Method includes optional time range where user would have different password and factor combinations for each time range. We also propose a method to use these factors for multi-factor authentication where user is required to format given text as per remotely sent instructions. We propose variation of proposed method that would send text and the instruction to format it using different factors through separate communication channels.

For user verification, our method asks user to format the given text or given picture as instructed using different formatting options.

16 Claims, 16 Drawing Sheets

(56) References Cited

U.S. PATENT DOCUMENTS

| | | | |
|---|---|---|---|
| 2007/0253553 A1* | 11/2007 | Abdul Rahman | G06F 21/31 380/259 |
| 2008/0077978 A1* | 3/2008 | Repasi | G06F 21/36 726/5 |
| 2009/0037419 A1* | 2/2009 | Huber | G06F 21/36 |
| 2010/0036772 A1* | 2/2010 | Arceneaux | G06Q 20/045 705/50 |
| 2010/0043062 A1* | 2/2010 | Alexander | G06F 21/36 726/6 |
| 2010/0100945 A1* | 4/2010 | Ozzie | G06F 21/35 726/5 |
| 2011/0055585 A1* | 3/2011 | Lee | H04L 9/0844 713/183 |
| 2012/0005542 A1* | 1/2012 | Petersen | G06F 11/0709 714/48 |
| 2012/0246303 A1* | 9/2012 | Petersen | G06F 17/30185 709/224 |
| 2013/0054433 A1* | 2/2013 | Giard | H04L 67/22 705/34 |
| 2013/0138968 A1* | 5/2013 | Yudkin | G06F 21/602 713/183 |
| 2013/0333010 A1* | 12/2013 | Chougle | G06F 21/46 726/7 |
| 2014/0007196 A1* | 1/2014 | Lin | G06F 21/31 726/4 |
| 2014/0040627 A1* | 2/2014 | Logan | G06F 21/46 713/182 |
| 2014/0130126 A1* | 5/2014 | Jakobsson | G06F 21/36 726/3 |
| 2014/0175179 A1* | 6/2014 | Carter | G06Q 20/385 235/494 |
| 2014/0282979 A1* | 9/2014 | Andon | H04L 63/0884 726/7 |
| 2014/0298421 A1* | 10/2014 | Johnson | H04L 63/083 726/4 |
| 2014/0317713 A1* | 10/2014 | Gadotti | H04L 63/0853 726/7 |
| 2015/0319159 A1* | 11/2015 | Abdul Hameed Khan | H04L 67/20 726/7 |
| 2015/0350251 A1* | 12/2015 | Brander | G06F 17/30876 713/168 |
| 2015/0371079 A1* | 12/2015 | Kohlenberg | G06F 21/31 348/77 |
| 2016/0070895 A1* | 3/2016 | Harjanto | G06F 21/44 726/30 |

\* cited by examiner

Fig. 1. User authentication using Formatting options
Formatted credentials for User authentication compared against pre-defined formatted user credentials.
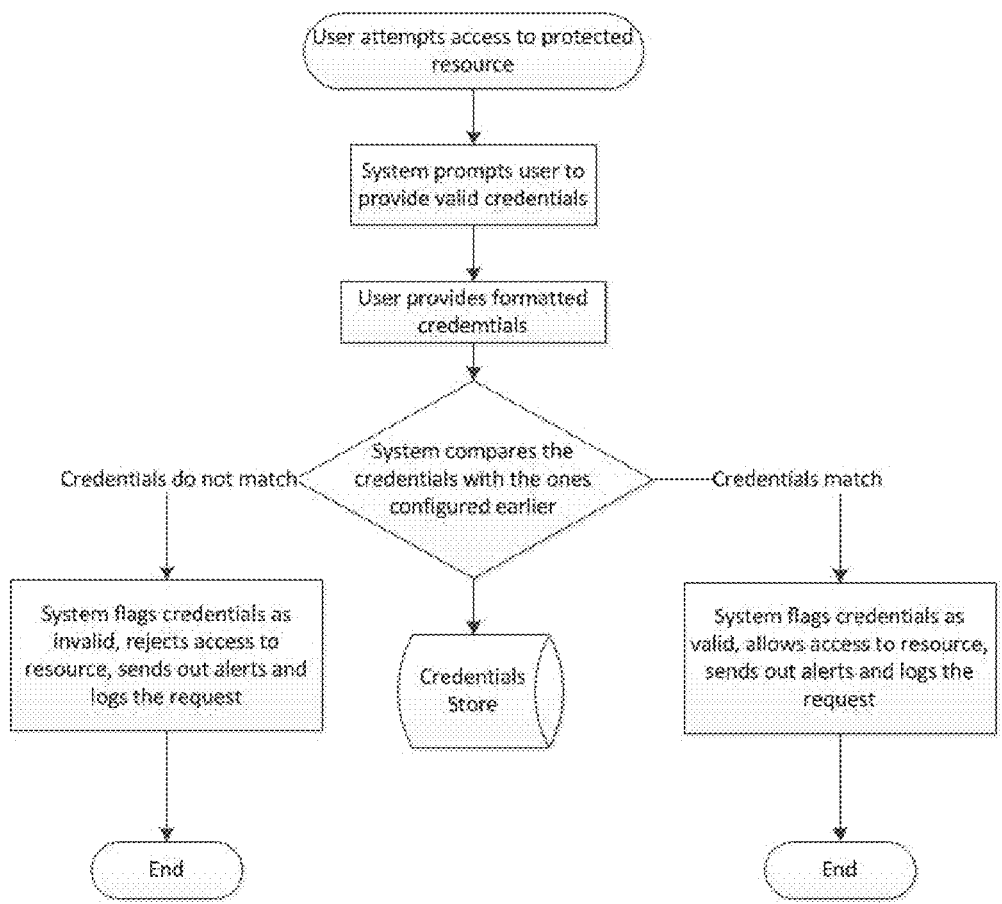

Fig. 2. Multifactor authentication using formatting options.
Formatted credentials for User authentication, user sent instructions to format through alternate communication preference.
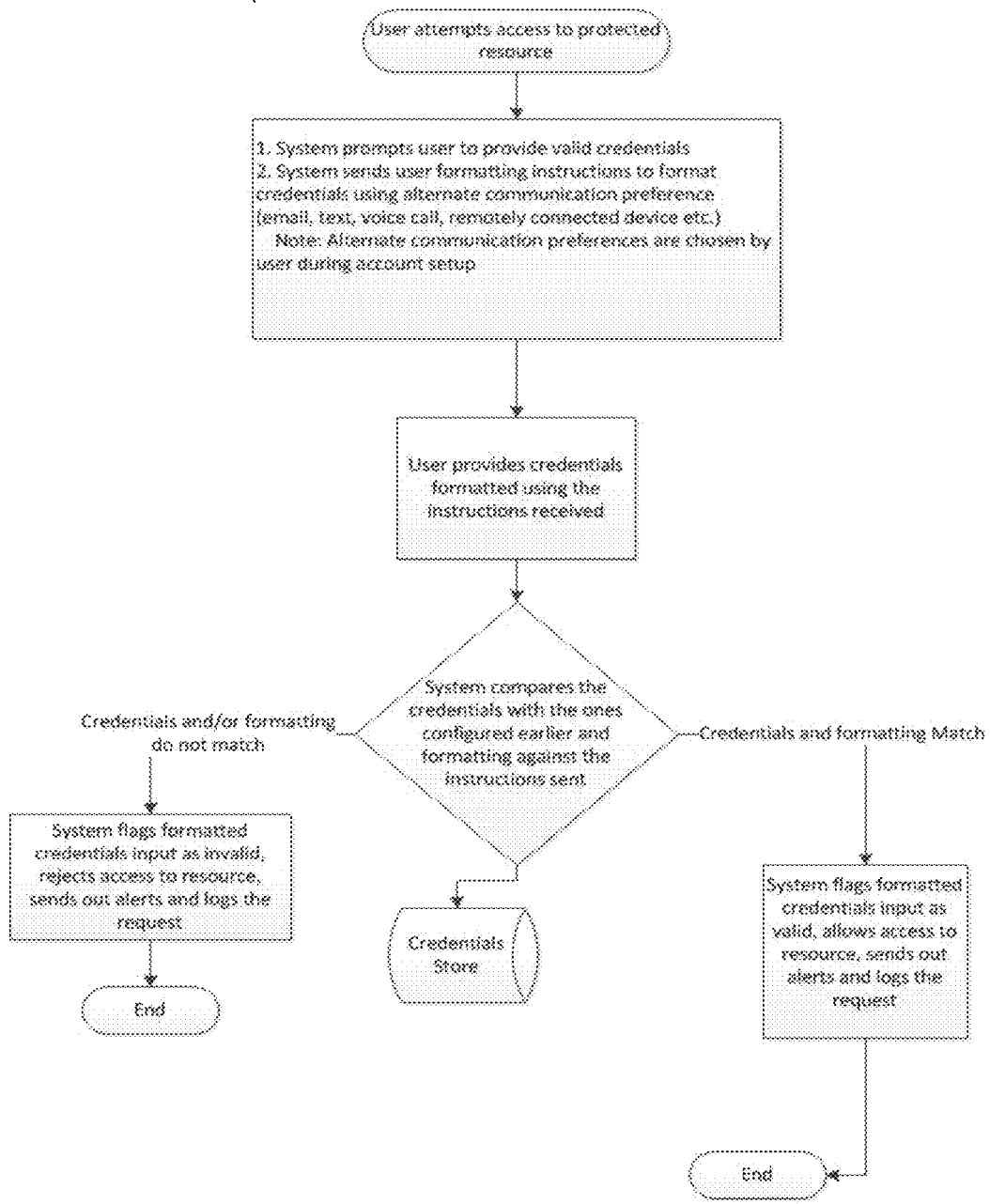

Fig. 3 Multifactor authentication using formatting options (Advanced).
Secret code and formatting instructions sent through separate alternate communication preference.
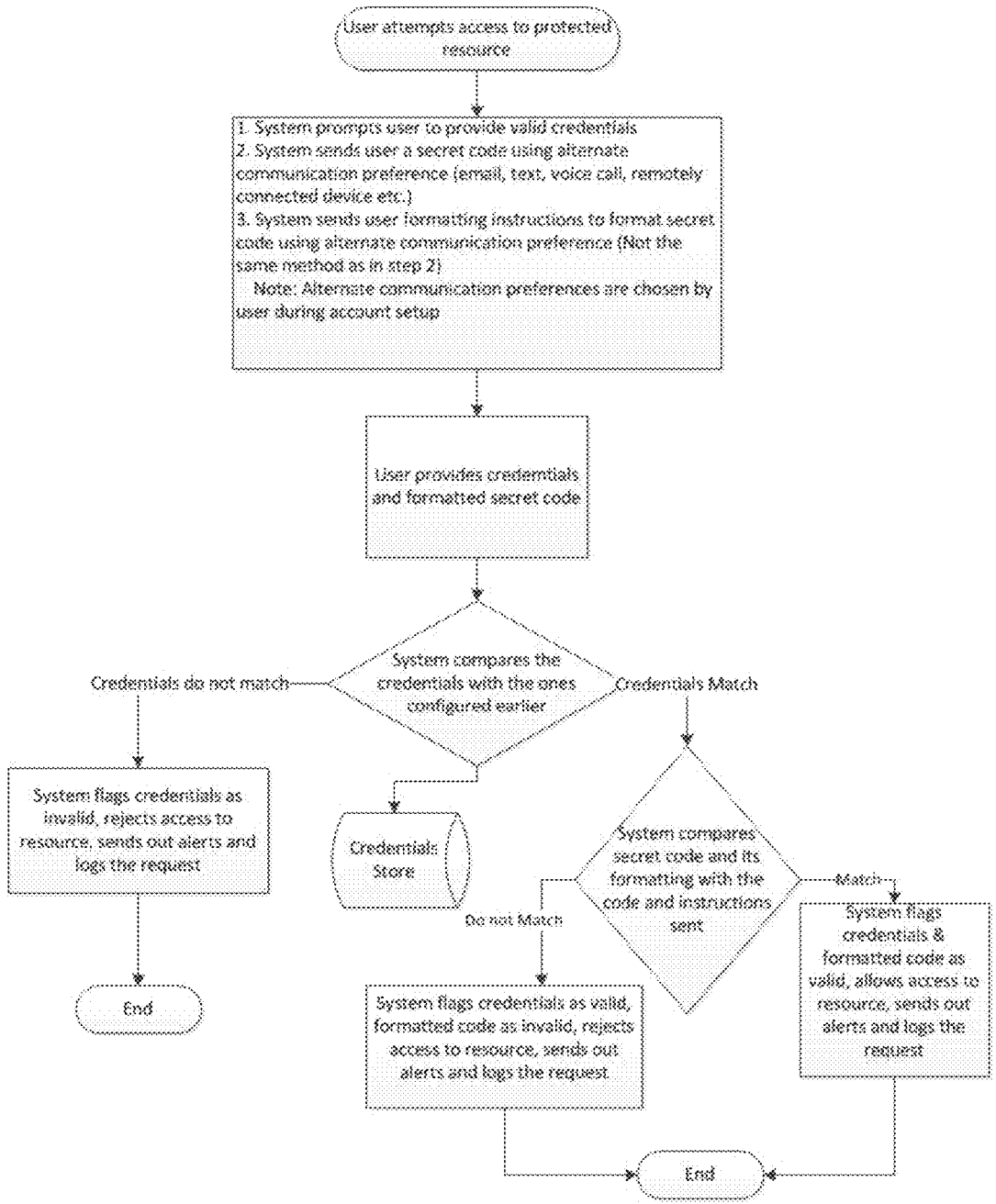

Fig. 4 User verification: User asked to format text using formatting options.
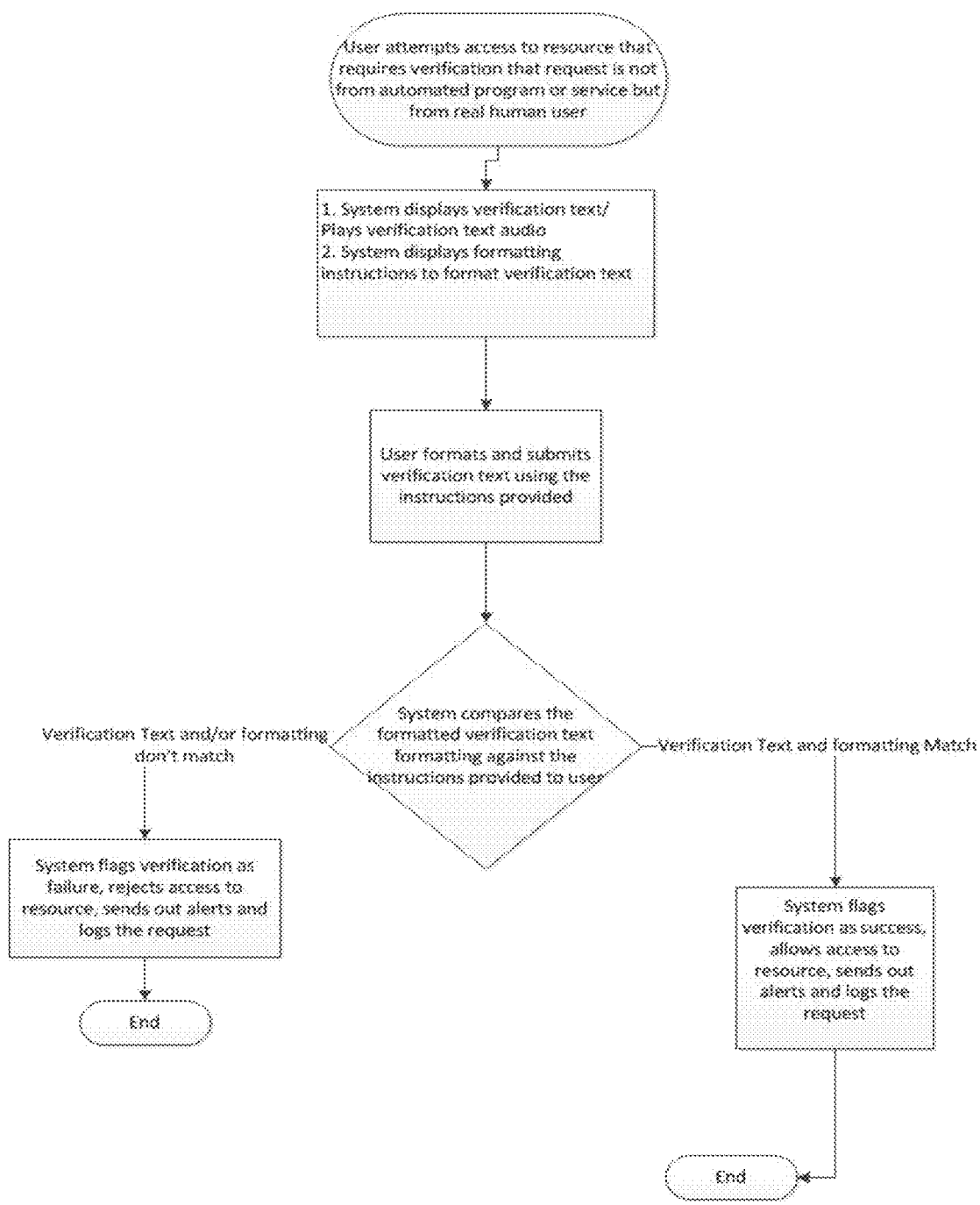

Fig. 5 User verification: User asked to format picture using formatting options.
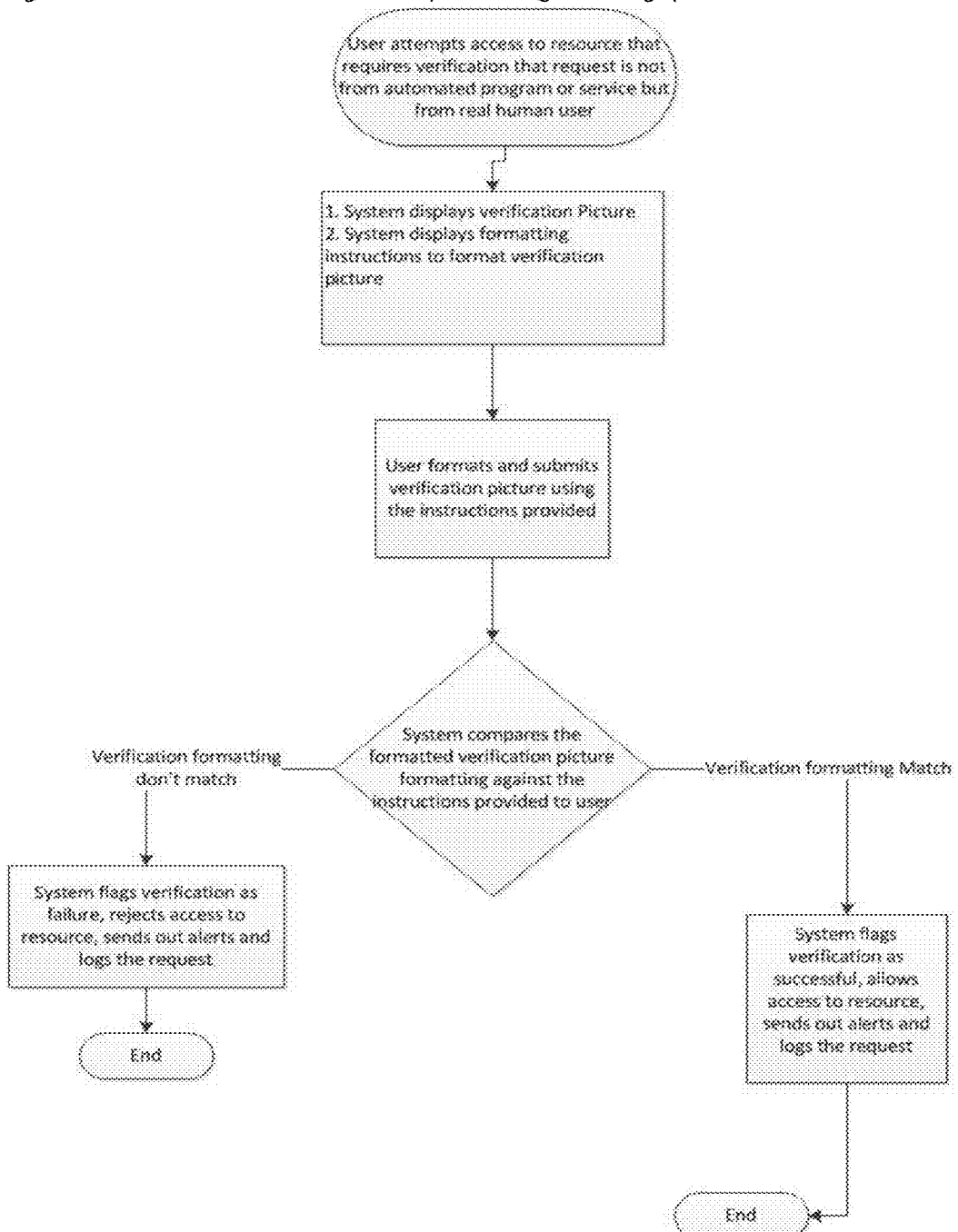

Fig. 6 Electronic Signature using formatting options
User asked to format signature using formatting options.
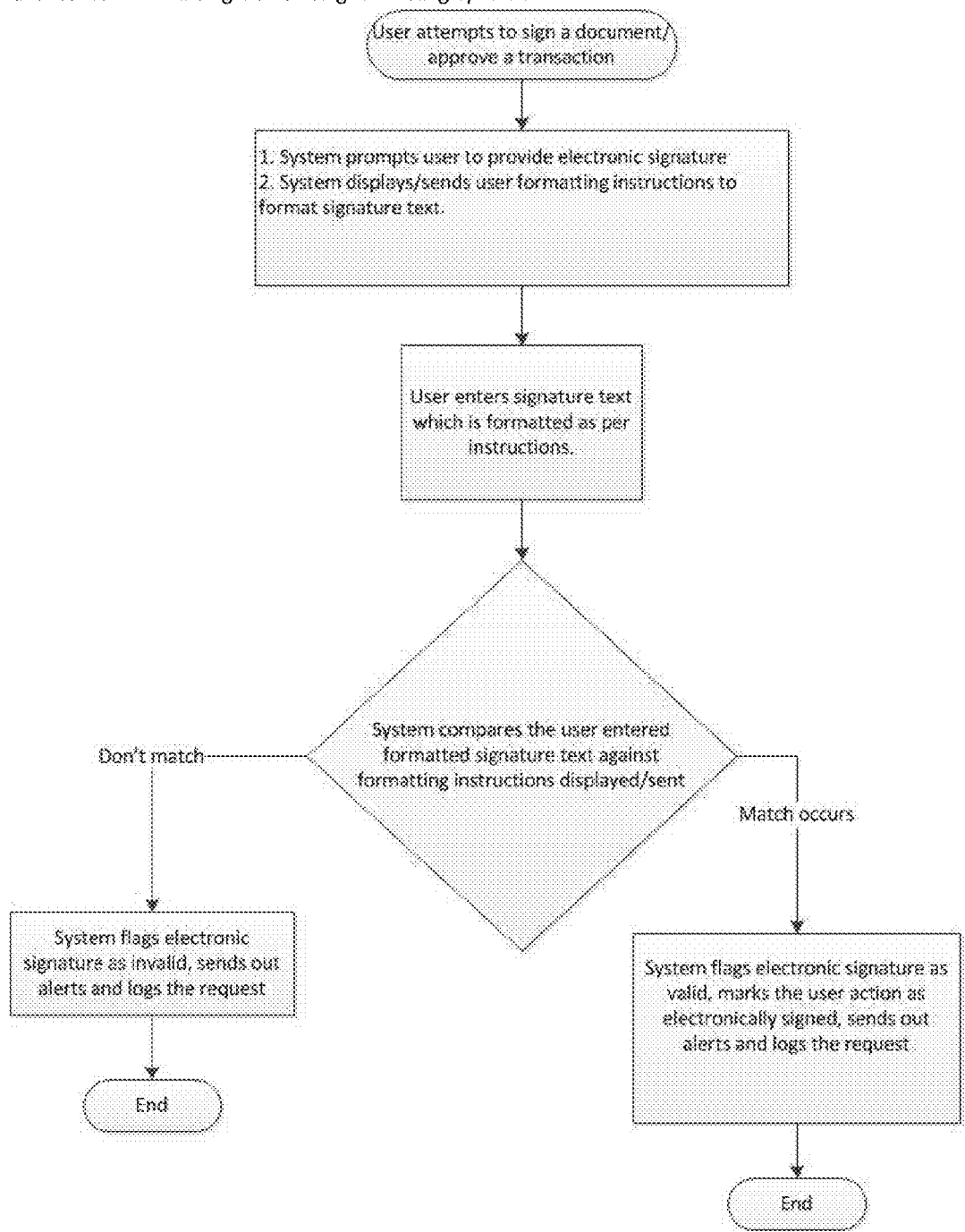

Examples of process implementation.
Fig. 7 User authentication: Credentials formatted using different font color.
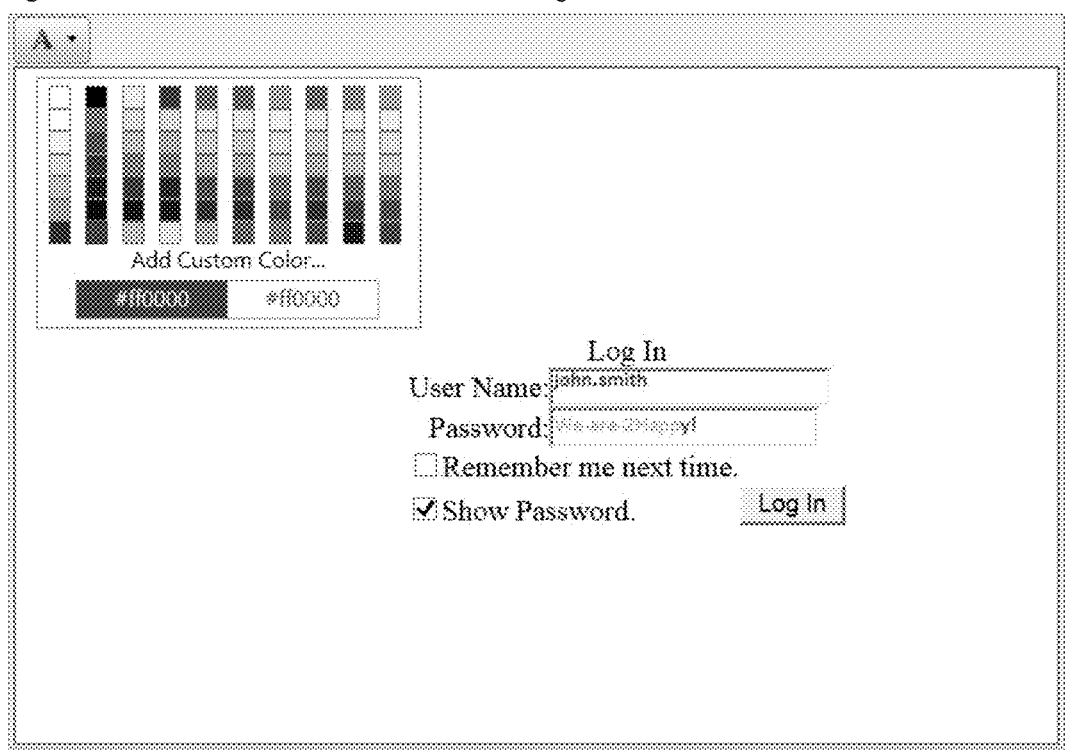

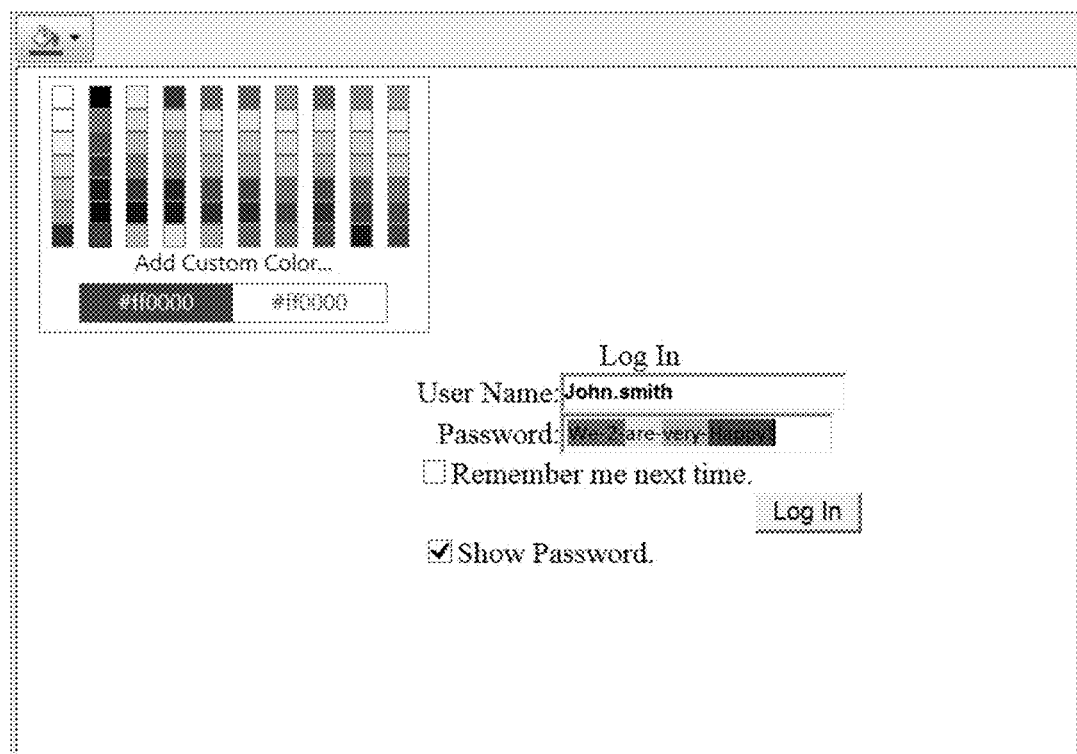
Fig. 8 User authentication: Credentials formatted using different fill colors.

Fig. 9 User authentication: Credentials formatted using different fonts.
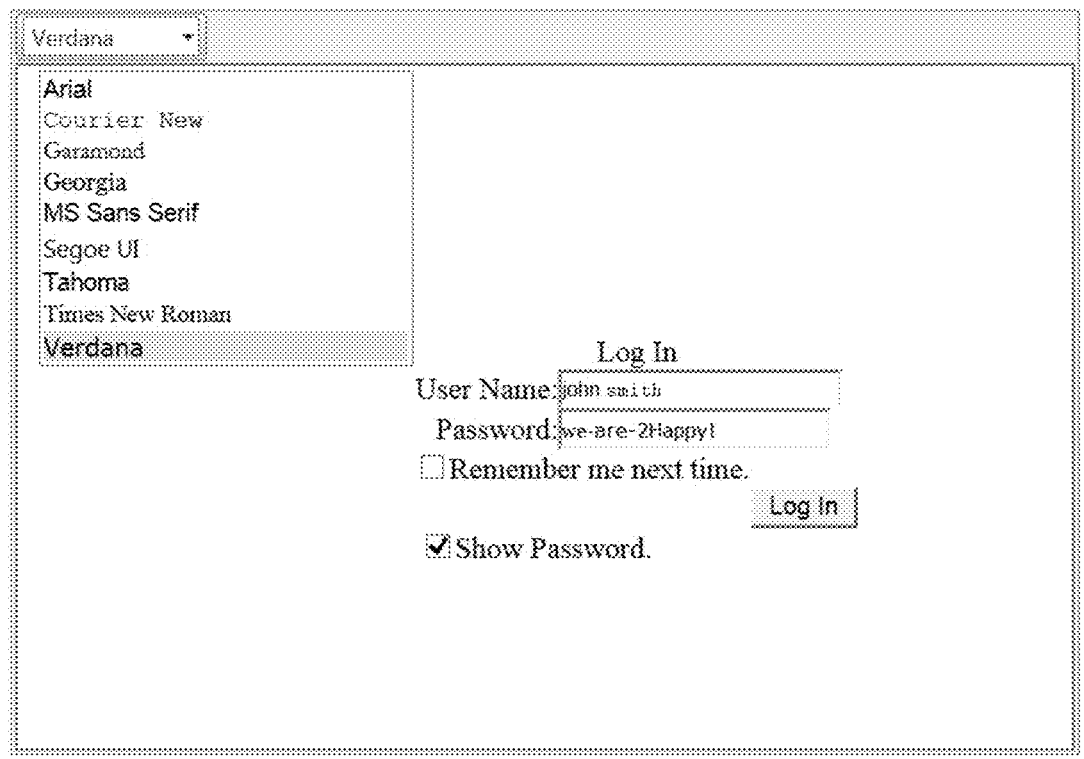

Fig. 10 User authentication: Credentials formatted using different font style.
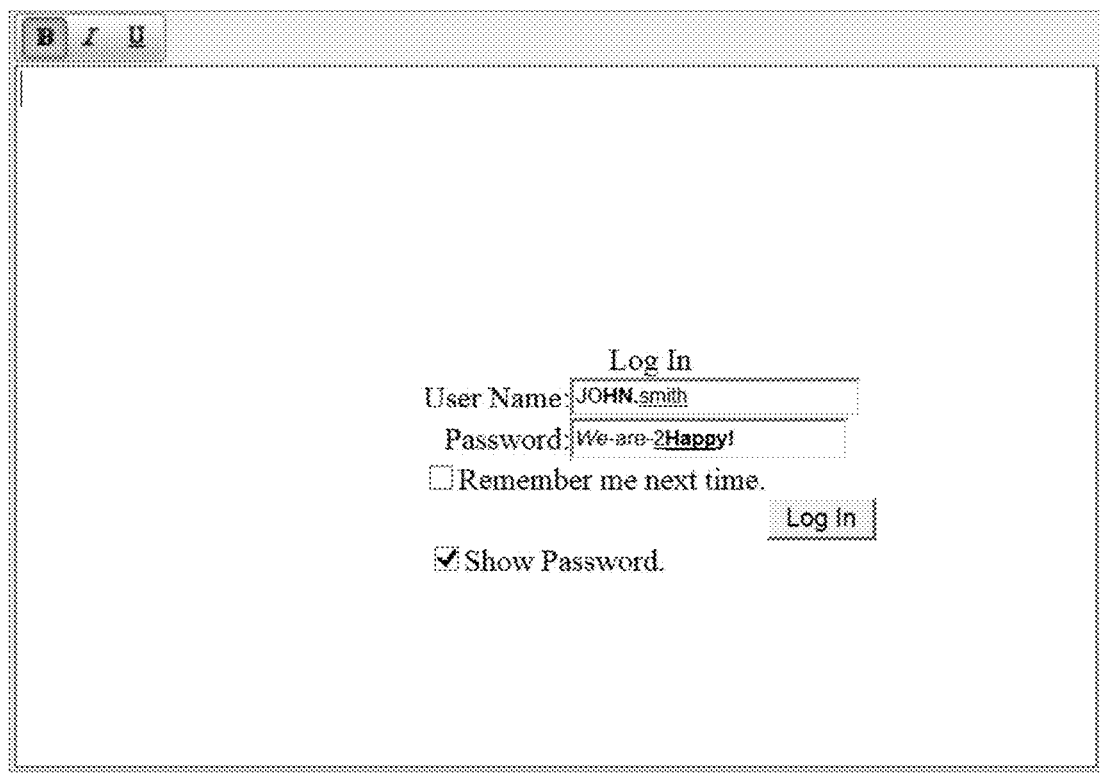

Fig. 11 User authentication: Credentials formatted using different font size.
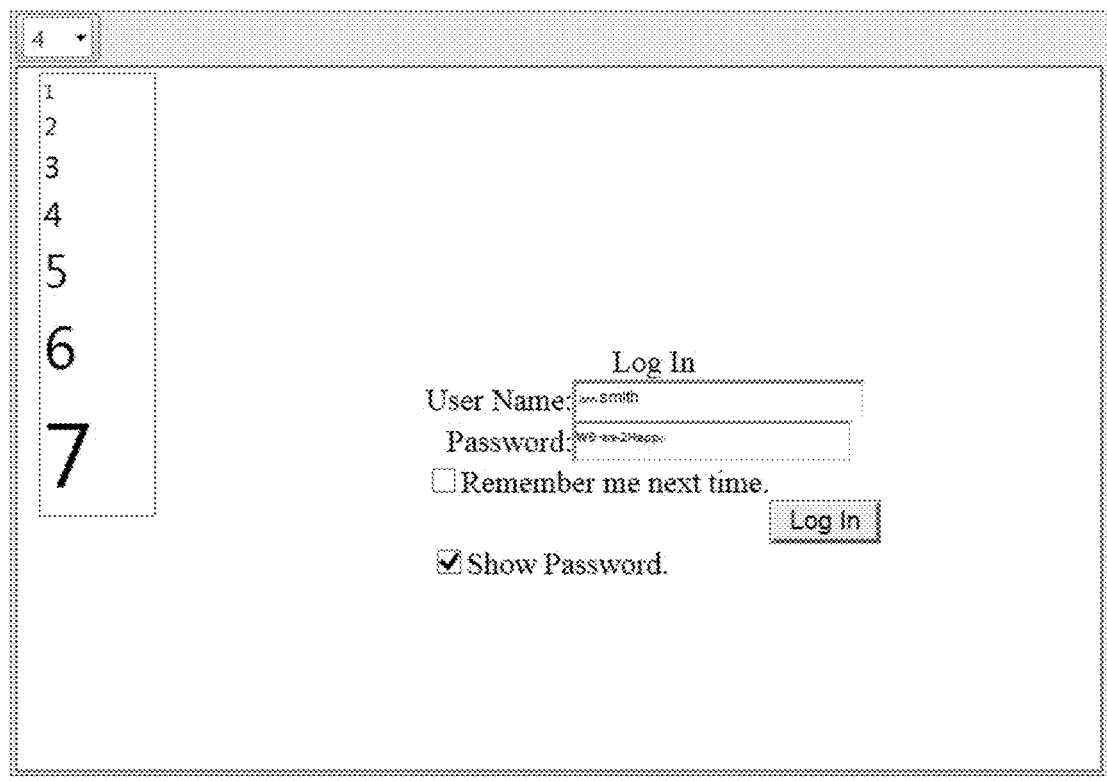

Fig. 12 User authentication: Credentials formatted using multiple formatting options
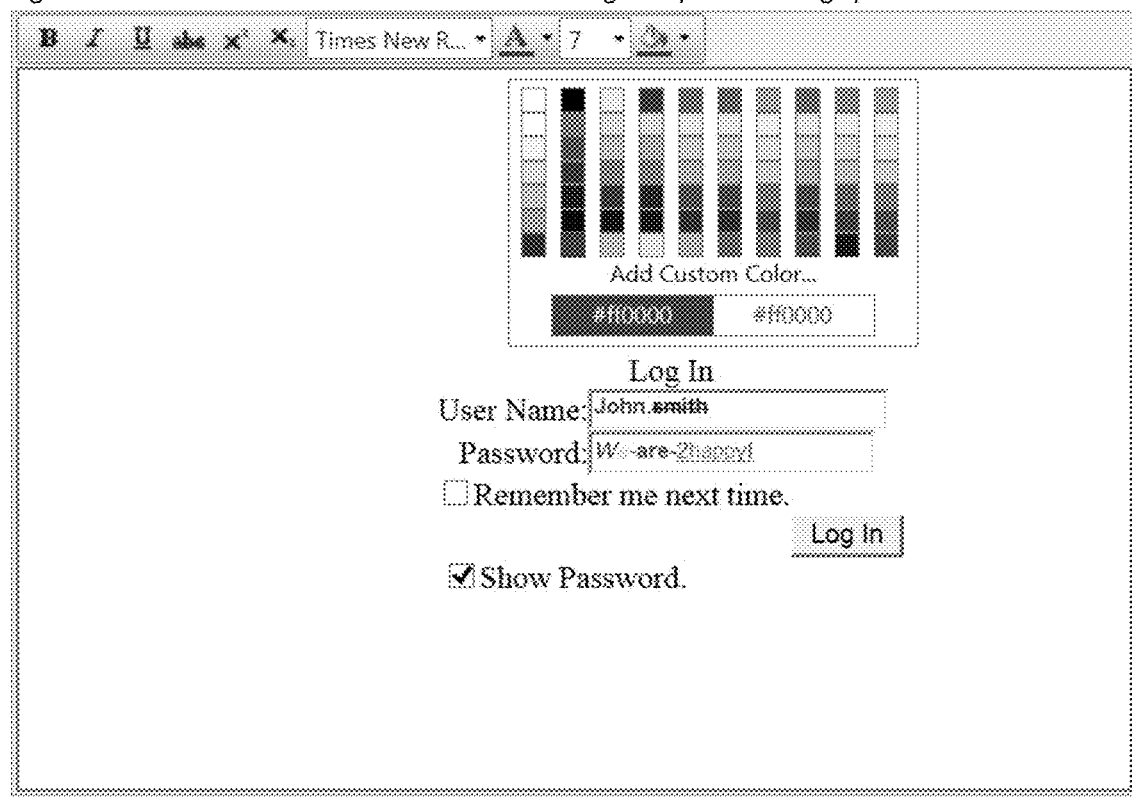

Fig. 13 User authentication: Selecting and Coloring a picture as part of credentials.
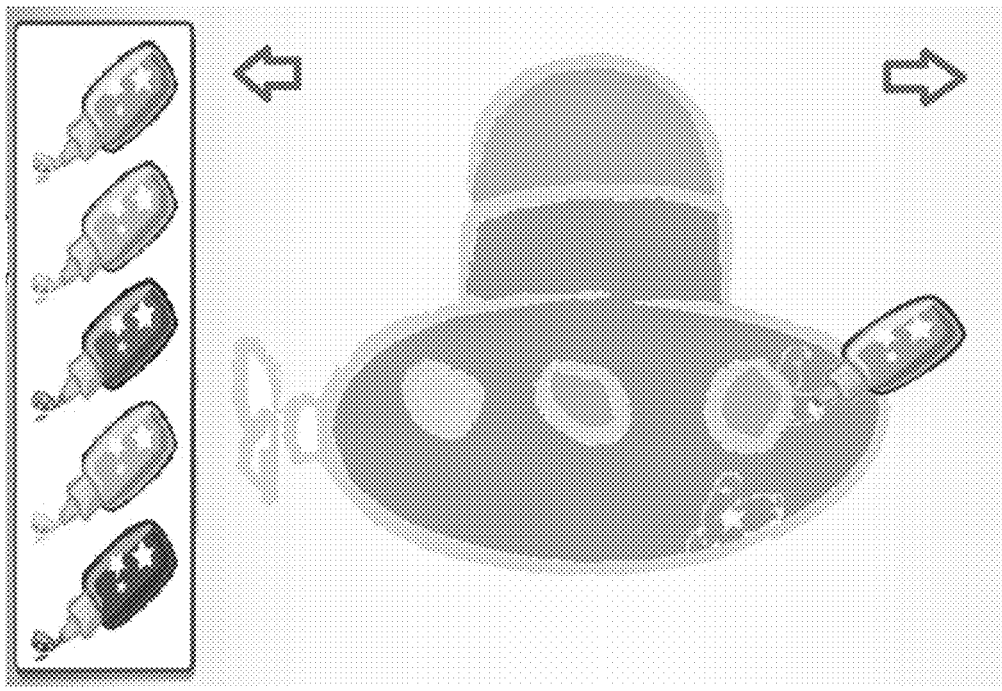

Fig. 14 User authentication: Selecting and Coloring a picture as part of credentials, in addition to user id and password. User would have to select his picture and color it.
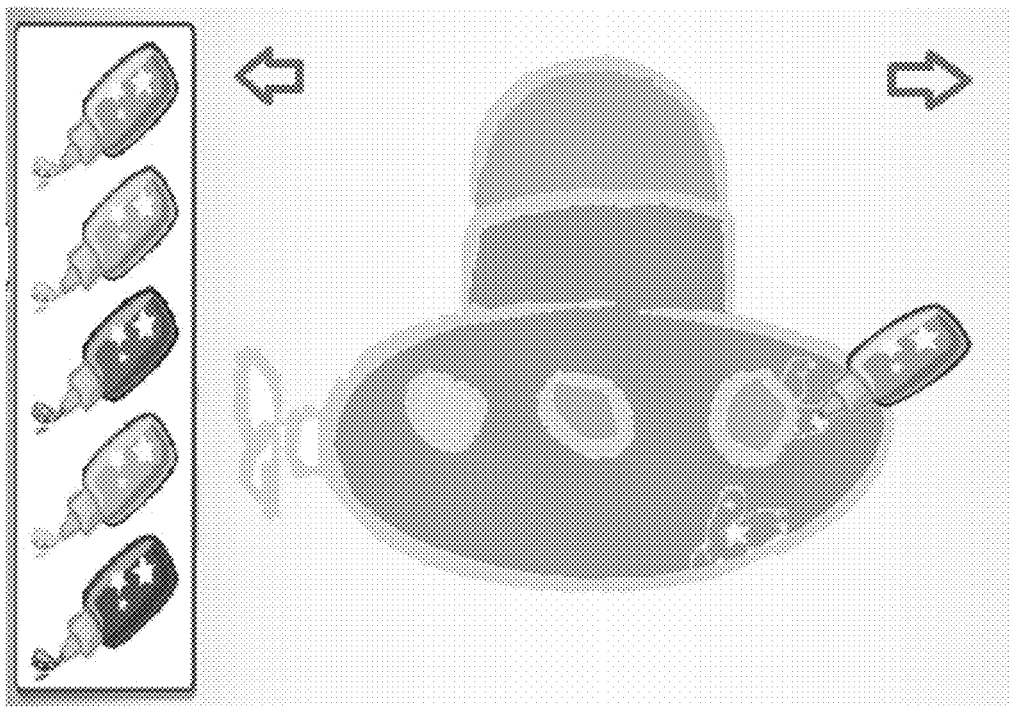

Fig. 15 User authentication: Coloring a picture as per instructions sent.
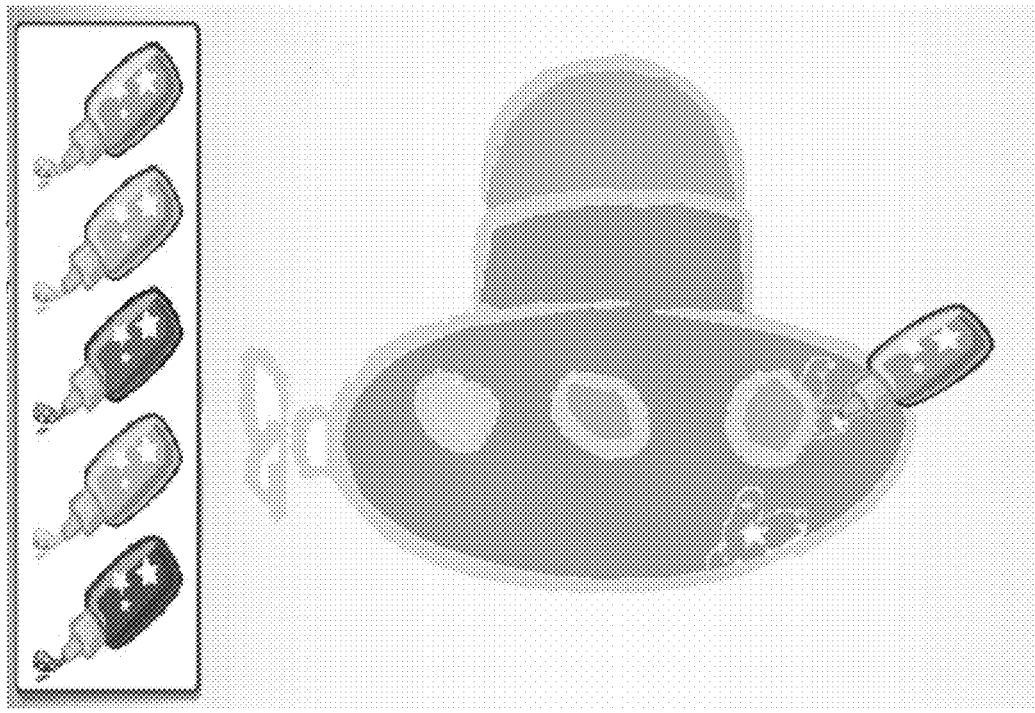

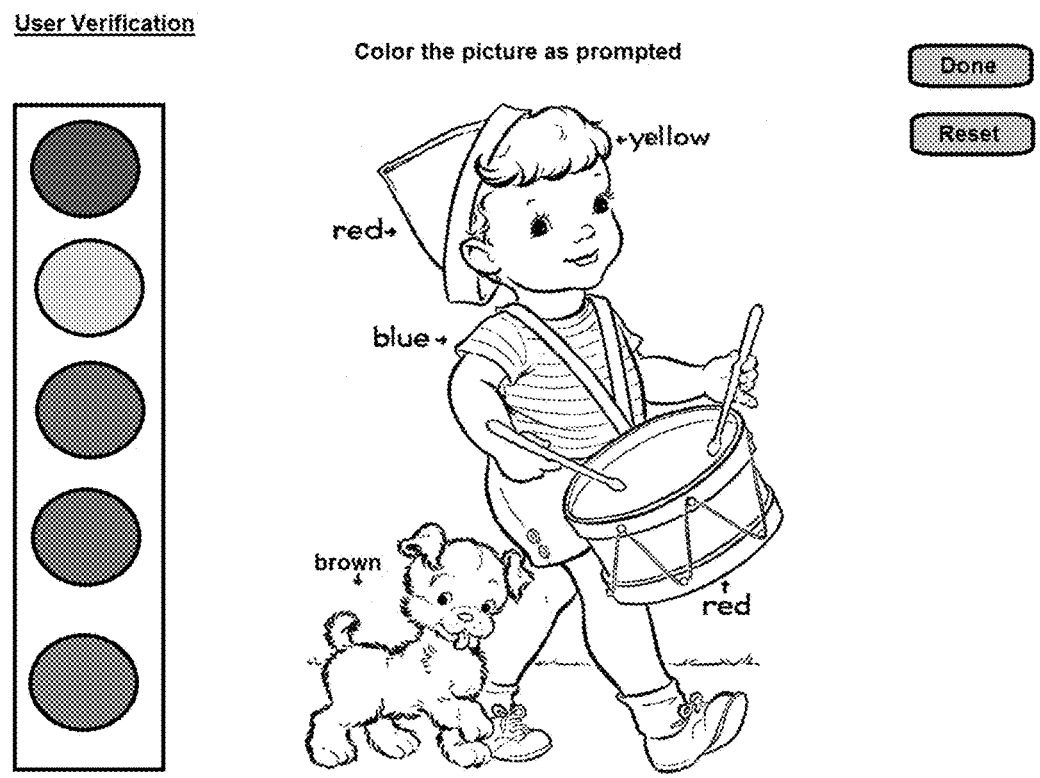
Fig. 16 User verification: Coloring a picture as prompted

METHOD OF USING TEXT AND PICTURE FORMATTING OPTIONS AS PART OF CREDENTIALS FOR USER AUTHENTICATION, AS A PART OF ELECTRONIC SIGNATURE AND AS A PART OF CHALLENGE FOR USER VERIFICATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

BACKGROUND OF THE INVENTION

The proposed invention concerns security. In particular, proposed method is to provide/improve/strengthen security for individual's any kind of data, information, credit, finances, services obtained (online and or offline), authenticate application user using formatting options.

Users are required to authenticate themselves before they access service such as file storage, emails, bank accounts, view and edit data, use cloud hosted applications, make purchases or make comments for example. They are also required to identify themselves as real valid human user and not a robo program before they can access many websites and web services.

In spite of many new authentication schemes, password-based user authentication is still widely used by installed software applications, smartphone apps, websites and web services due to its convenience, and ease in use and deployment. With ever growing instances of passwords and credentials getting compromised its necessary to invent strong mechanism which is multi-layered but at the same time simple enough for users to work with.

In password-based user authentication users are required to input textual password to identify them as valid user. Now because of its simplicity passwords are prone to hacking. Users are always asked to increase complexity of their passwords which leads to user forgetting them often and as a result instances user getting locked out of their own accounts.

BRIEF SUMMARY OF THE INVENTION

We propose methods which fortifies password based User Authentication and makes user and captcha verification more robust. It uses factors in the form of formatting options factor and time factor.

As per our method, user can format password by choosing combination of one or more font color for each character or word in password. User can also apply one or more factor of Font, Font Size, Font Color, Shading, Font Style, Font Effects, Font Underline and Character effects for each character or word in password. User can also choose time factor by defining different passwords for different days of week. Our method increases the complexity of the user credentials but at the same time keeps it simple to remember and use.

We also propose enhanced method of user authentication where user is sent secret code by one communication method or channel and formatting instructions by another to method or channel creating multi-factor authentication scenario (multi-factor authentication using out of band delivery methods for sending code and formatting instructions). User will provide both user id, password pair and secret code formatted as per instructions. If all four input match (userid, password, secret code, formatting of secret code) user passes authentication. In case of Electronic signature user can provide their name or initials that is formatted in the same way as his sample electronic signatures provided earlier to the system or as per formatting instructions sent to him. This is not same as real hand drawn signature but lot of improvement upon basic non formatted text entry of name or initials.

BRIEF DESCRIPTION OF THE SEVERAL VIEWS OF THE DRAWING

Flowcharts

FIG. 1. User authentication using Formatting options

Formatted credentials for User authentication compared against pre-defined formatted user credentials.

FIG. 2 Multifactor authentication using formatting options.

Formatted credentials for User authentication, user sent instructions to format through alternate communication preference.

FIG. 3 Multifactor authentication using formatting options (Advanced).

Secret code and formatting instructions sent through separate alternate communication preference.

FIG. 4 User verification: User asked to format text using formatting options.

FIG. 5 User verification: User asked to format picture using formatting options.

FIG. 6 Electronic Signature using formatting options

User asked to format signature using formatting options.
Examples of Process Implementation.

FIG. 7 User authentication: Credentials formatted using different font color.

FIG. 8 User authentication: Credentials formatted using different fill colors.

FIG. 9 User authentication: Credentials formatted using different fonts.

FIG. 10 User authentication: Credentials formatted using different font style.

FIG. 11 User authentication: Credentials formatted using different font size.

FIG. 12 User authentication: Credentials formatted using multiple formatting options FIG. 13 User authentication: Selecting and Coloring a picture as part of credentials.

FIG. 14 User authentication: Selecting and Coloring a picture as part of credentials, in addition to user id and password. User would have to select his picture and color it.

FIG. 15 User authentication: Coloring a picture as per instructions sent.

FIG. 16 User verification: Coloring a picture as prompted

DETAILED DESCRIPTION

Given below are the examples of user choosing different factor values for different characters in his password text.
  a. Example of User choosing different colors for different characters: We-are-2Happy!
    Here "We-" is colored in blue, "are-2" colored in red, "H" colored in Green, "app" colored in pink and "y!" colored in black.
  b. Example of User choosing different fonts for different characters: We-*are*-2Happy!
    Here "We-" is having Font Arial, "are-2" is having Font Lucida Handwriting, "H" is having Font Arial Black, "app" is having Font Tempus Sans ITC and "y!" is having Font Broadway.
  c. Example of User choosing different font sizes for different characters: We-are-2Happy!
    Here "We-" is having Font size 11, "are-2" is having Font size 16, "H" is having Font size 8, "app" is having Font size 14 and "y!" is having Font size 9.
  d. Example of User choosing different font styles for different characters: We-are-2_Happy!_
    Here "We-" is not having Font style "Regular", "are-2" is having Font style "Bold", "H" is having Font style "Italic", "appy!" is having Font style "Bold Italic".
  e. Example of User choosing different font effects for different characters: ^(We-)ARE-~~notvery~~-HAPPY.
    Here "We-" is having Font effect "Superscript", "are-" is having Font effect "small caps", "not" is having Font effect "Strikethrough", "very-" is having Font effect "Double Strikethrough", HAPPY! is having Font effect ALL CAPS.
  f. Example of User choosing different font underline style for different characters: We-are-<u>2Happy</u>
    Here "We-are" is having no Font underline style, "2Happy" is having Font Underline style.
  g. Example of User choosing different shading for different characters: We-2-are-very-Happy
    Here "We-2-are" is having shading of dark black, "very-" is having shading of light blue, and "Happy!" is having shading of dark grey.

Given below is the example of user using combination of factors of font, font style, font size and font color. User can configure one or more set of factors for password characters.
  E.g. MySecretcode1 on Monday, Wednesday, Friday and MySecretCode2 on rest of the days of the week.

Our Method includes an optional factor of "Time range" to be used with other factors proposed.

User can choose to have same set of factors all the time or he can choose to have set of factors vary by time. User can choose different factors at different times like day of the week, season, by time of day, week, month or by particular time ranges like 8 to 12 PM Font 1 and Size 10, Color sequence 1, 12 to 3 PM Font 2 and Size 12, Color sequence 2. User may also choose to vary password by time.

During authentication, user has to submit correct password and format it using set of factors of font, font size, font color, font style, font effects, font underline that would be valid at the time of entry. In example above user has chosen two sets of formatting for his password. One for Monday, Wednesday and Friday and other for Tuesday, Thursday, Saturday and Sunday.

We also propose a method to use these format factors for multi-factor authentication where user is required to format password or given text as per remotely sent instructions. User will be asked in Real Time to enter password or given text in given format by sending randomly generated instructions via different communication means like email, text message, chat message, voice message, video message or through dedicated instruction receiving device receiving instructions remotely.

E.g. User attempting to login to his account is sent an instruction via registered device to enter password in "Arial" Font size 14, color blue for first two characters, color dark green for last two characters, last 4 characters in italic. If user enters correct password and formats it according to factor combination instruction sent to him, he is considered to have pass the validation and allowed access.

We propose variation of proposed method that would send text and the instruction to format it using different factors through separate communication channels.

We propose another variation for multi-factor authentication where instead of actual instruction, user is sent factor combination code or message that pairs with configured factor combination. Only user would know which code pairs with which configuration. User will have to format the password or given text using his the instruction that would match with the code or message that he received.

E.g. when user is sent code "BigOrange" and he would infer that it is paired with factors of Font size 16 and Font color Orange based on his personal knowledge just as he knows his password. User will apply font size of 16 and font color of orange to pass the validation. Code can be generated by user himself or it can be some system generated value like "FC1001". User would be pre-configuring pairs of Format factor combinations. If user has configured 3 pairs of format code and format factor combination, system will randomly choose one code and send it to the user.

During user verification, user has to format the characters of word(s) in exactly in same way as it is instructed by using same Font, Font Size, Font Color, Font Style, Font Effects and Font Underline given in instructions. If match occurs, entity attempting to fulfill a challenge is considered to be real human user.

We also propose technique that can be used as an alternative to passwords and user captcha verification text.

Images are always easy for users to remember and work with.

The new technique is to have user perform actions such as picture tweaking, applying picture effects, tinting, filtering, folding, coloring, cutting, zooming, picture bordering and framing to match stored picture credential in case user authentication or to match displayed picture during user captcha verification. User can store different picture credential for different time slots and locations.

If picture that gets generated as a result of user actions matches stored credential picture valid at that moment, user is said to be authenticated. Similarly, during captcha verification if user actions result in a match with displayed picture, entity attempting at captcha is considered to be real human user and not a robot program.

Proposed techniques are aimed at making it very hard to making it impossible for hackers to steal or use stolen credentials and at the same time it's easy for users to use it.

The invention claimed is:

1. A computer-implemented process of authenticating a user requesting access to protected resource using credentials that are personalized using formatting options, the process comprising:
   using a computing device to perform the steps of:
     capturing credentials from the user which are formatted using formatting options, wherein the credentials comprise one or more of formatted user name, formatted password or formatted numerical PIN, and wherein the formatting options comprise Font, Font Size, Font Color, Shading, Font Style, Font Effects, Font Underline, and character effects;

comparing the captured formatted credentials against formatted credentials stored on a server that are designated by the user as valid credentials prior to requesting access;

flagging the captured credentials as valid and allowing the user to have access when the comparison indicates that a match occurs;

flagging the captured credentials as invalid and rejecting the request for access when the comparison indicates that a match does not occur;

alerting the user via alert communication methods chosen by the user including email, text message, voice message, voice call, SMS, audible alarm, or visual clues; and logging the user request and the steps performed by the computing device.

2. The process of claim 1, wherein the protected resource is a software application, software service, website, web service, data, hardware device, mobile app, smartphone app, physical area, physical item, bank account, trading account, credit limit, monetary balance, reward points, computer device, or communication device.

3. The process of claim 1, where in wherein the valid credentials are set for each time range and time range is of duration of minutes, a day, days, week, weeks, month, years, day of week or time period of the day.

4. A computer-implemented process of authenticating a user requesting access to protected resource using credentials that are personalized using formatting options, the process comprising:

using a computing device to perform the steps of:

capturing credentials from the user which are formatted using formatting options, wherein the credentials comprise a formatted picture selected out of many and formatted by the user, and wherein the formatting options comprise applying picture effects, tinting, filtering, folding, cropping, coloring, cutting, zooming, styling, picture bordering, and framing;

comparing the captured formatted credentials against formatted credentials stored on a server that are designated by the user as valid credentials prior to requesting access;

flagging the captured credentials as valid and allowing the user to have access when the comparison indicates that a match occurs;

flagging the captured credentials as invalid and rejecting the request for access when the comparison indicates that a match does not occur;

alerting the user via alert communication methods chosen by the user including email, text message, voice message, voice call, SMS, audible alarm, or visual clues; and logging the user request and the steps performed by the computing device.

5. The process of claim 1, wherein the protected resource is a software application, software service, website, web service, data, hardware device, mobile app, smartphone app, physical area, physical item, bank account, trading account, credit limit, monetary balance, reward points, computer device, or communication device.

6. The process of claim 1, where in wherein the valid credentials are set for each time range and time range is of duration of minutes, a day, days, week, weeks, month, years, day of week or time period of the day.

7. A computer-implemented user authentication process that is independently invokable for authenticating a user request to access a protected resource or to supplement authenticating a user requesting access to the protected resource, the process comprising:

using a computing device to perform the steps of:

delivering formatting instructions, which instruct the user how to format a given text using formatting options comprising of Font, Font Size, Font Color, Shading, Font Style, Font Effects, Font Underline, and character effects, to the user over an alternate channel including Email, SMS, voice message, picture message, video message, or hardware device given to user to receive instructions remotely;

providing the text to the user to format;

capturing the text on which the user has applied formatting using the formatting instructions;

comparing the captured formatted text against a stored text on a server that is formatted using same instructions sent to the user using the alternate channel;

flagging the captured text as correctly formatted and alternate authentication process as success when the comparison indicates that a match occurs;

flagging the captured text as incorrectly formatted and alternate authentication process as failure when the comparison indicates that a match does not occur;

alerting user via alert communication methods of user including email, text message, voice message, voice call, SMS, audible alarm, or visual clues; and logging the steps performed by the computing device.

8. The process of claim 1, wherein the protected resource is a software application, software service, website, web service, data, hardware device, mobile app, smartphone app, physical area, physical item, bank account, trading account, credit limit, monetary balance, reward points, computer device, or communication device.

9. The process of claim 7, wherein the text provided to user to format is delivered using the alternate channel including Email, SMS, text message, voice message, picture message, or video message.

10. The process of claim 7, wherein formatting instructions delivered are encoded and decodable by the user having a decode key.

11. The process of claim 7, wherein formatting instructions delivered are in the form of format instruction hints that the user has setup while configuring a set of formatting instructions for the process to choose randomly when the user makes access request.

12. A computer-implemented user authentication process that is independently invokable for authenticating a user request to access a protected resource or to supplement authenticating a user requesting access to the protected resource, the process comprising:

using a computing device to perform the steps of:

delivering formatting instructions, which instruct the user how to format a given picture using formatting options comprising of applying picture effects, tinting, filtering, folding, cropping, coloring, cutting, zooming, styling, picture bordering, and framing, to the user over an alternate channel including Email, SMS, voice message, picture message, video message, or hardware device given to user to receive instructions remotely;

providing the picture to the user to format;

capturing the picture on which the user has applied formatting using the formatting instructions;

comparing the captured formatted text against a stored picture on a server that is formatted using same instructions sent to the user using the alternate channel;

flagging the captured image as correctly formatted and alternate authentication process as success when the comparison indicates that a match occurs;

flagging the captured image as incorrectly formatted and alternate authentication process as failure when the comparison indicates that a match does not occur;

alerting user via alert communication methods of user including email, text message, voice message, voice call, SMS, audible alarm, or visual clues; and logging the steps performed by the computing device.

13. The process of claim 1, wherein the protected resource is a software application, software service, website, web service, data, hardware device, mobile app, smartphone app, physical area, physical item, bank account, trading account, credit limit, monetary balance, reward points, computer device, or communication device.

14. The process of claim 7, wherein the picture provided to user to format is delivered using a different alternate channel including Email, SMS, text message, voice message, picture message, or video message.

15. The process of claim 7, wherein formatting instructions delivered are encoded and decodable by the user having a decode key.

16. The process of claim 7, wherein formatting instructions delivered are in the form of format instruction hints that the user has setup while configuring a set of formatting instructions for the process to choose randomly when the user makes access request.

* * * * *

UNITED STATES PATENT AND TRADEMARK OFFICE
CERTIFICATE OF CORRECTION

PATENT NO. : 9,536,069 B1
APPLICATION NO. : 14/839162
DATED : January 3, 2017
INVENTOR(S) : Dhavalkumar Shah and Nehal Mehta It is certified that error appears in the above-identified patent and that said Letters Patent is hereby corrected as shown below:

In the Claims

Column 4 Line 61 through Column 7, Line 31:
Delete the claims and substitute the attached claims therefor 1. A computer-implemented process of authenticating a user requesting access to protected resource using credentials that are personalized using formatting options, the process comprising:
    using a computing device to perform the steps of:
    capturing credentials from the user which are formatted using formatting options, wherein the credentials comprise one or more of formatted user name, formatted password or formatted numerical PIN, and wherein the formatting options comprise Font, Font Size, Font Color, Shading, Font Style, Font Effects, Font Underline, and character effects;
    comparing the captured formatted credentials against formatted credentials stored on a server that are designated by the user as valid credentials prior to requesting access;
    flagging the captured credentials as valid and allowing the user to have access when the comparison indicates that a match occurs;
    flagging the captured credentials as invalid and rejecting the request for access when the comparison indicates that a match does not occur;
    alerting the user via alert communication methods chosen by the user including email, text message, voice message, voice call, SMS, audible alarm, or visual clues; and
    logging the user request and the steps performed by the computing device.

2. The process of Claim 1, wherein the protected resource is a software application, software service, website, web service, data, hardware device, mobile app, smartphone app, physical area, physical item, bank account, trading account, credit limit, monetary balance, reward points, computer device, or communication device.

3. The process of Claim 1, wherein the valid credentials are set for each time range and time range is of duration of minutes, a day, days, week, weeks, month, years, day of week or time period of the day.

Signed and Sealed this
Twenty-fifth Day of April, 2017

Michelle K. Lee
*Director of the United States Patent and Trademark Office*

4. A computer-implemented user authentication process that is independently invokable for authenticating a user request to access a protected resource or to supplement authenticating a user requesting access to the protected resource, the process comprising:
    using a computing device to perform the steps of:
    delivering formatting instructions, which instruct the user how to format a given text using formatting options comprising of Font, Font Size, Font Color, Shading, Font Style, Font Effects, Font Underline, and character effects, to the user over an alternate channel including Email, SMS, voice message, picture message, video message, or hardware device given to user to receive instructions remotely;
    providing the text to the user to format;
    capturing the text on which the user has applied formatting using the formatting instructions;
    comparing the captured formatted text against a stored text on a server that is formatted using same instructions sent to the user using the alternate channel;
    flagging the captured text as correctly formatted and alternate authentication process as success when the comparison indicates that a match occurs;
    flagging the captured text as incorrectly formatted and alternate authentication process as failure when the comparison indicates that a match does not occur;
    alerting user via alert communication methods of user including email, text message, voice message, voice call, SMS, audible alarm, or visual clues; and
    logging the steps performed by the computing device.

5. The process of Claim 4, wherein the protected resource is a software application, software service, website, web service, data, hardware device, mobile app, smartphone app, physical area, physical item, bank account, trading account, credit limit, monetary balance, reward points, computer device, or communication device.

6. The process of Claim 4, wherein the text provided to user to format is delivered using the alternate channel including Email, SMS, text message, voice message, picture message, or video message.

7. The process of Claim 4, wherein formatting instructions delivered are encoded and decodable by the user having a decode key.

8. The process of Claim 4, wherein formatting instructions delivered are in the form of format instruction hints that the user has setup while configuring a set of formatting instructions for the process to choose randomly when the user makes access request.

9. A computer-implemented process of authenticating a user requesting access to protected resource using credentials that are personalized using formatting options, the process comprising:
    using a computing device to perform the steps of:
    capturing credentials from the user which are formatted using formatting options, wherein the credentials comprise a formatted picture selected out of many and formatted by the user, and wherein the formatting options comprise applying picture effects, tinting, filtering, folding, cropping, coloring, cutting, zooming, styling, picture bordering, and framing;
    comparing the captured formatted credentials against formatted credentials stored on a server that are designated by the user as valid credentials prior to requesting access;

flagging the captured credentials as valid and allowing the user to have access when the comparison indicates that a match occurs;

flagging the captured credentials as invalid and rejecting the request for access when the comparison indicates that a match does not occur;

alerting the user via alert communication methods chosen by the user including email, text message, voice message, voice call, SMS, audible alarm, or visual clues; and logging the user request and the steps performed by the computing device.

10. The process of Claim 9, wherein the protected resource is a software application, software service, website, web service, data, hardware device, mobile app, smartphone app, physical area, physical item, bank account, trading account, credit limit, monetary balance, reward points, computer device, or communication device.

11. The process of Claim 9 wherein the valid credentials are set for each time range and time range is of duration of minutes, a day, days, week, weeks, month, years, day of week or time period of the day.

12. A computer-implemented user authentication process that is independently invokable for authenticating a user request to access a protected resource or to supplement authenticating a user requesting access to the protected resource, the process comprising:

using a computing device to perform the steps of:

delivering formatting instructions, which instruct the user how to format a given picture using formatting options comprising of applying picture effects, tinting, filtering, folding, cropping, coloring, cutting, zooming, styling, picture bordering, and framing, to the user over an alternate channel including Email, SMS, voice message, picture message, video message, or hardware device given to user to receive instructions remotely;

providing the picture to the user to format;

capturing the picture on which the user has applied formatting using the formatting instructions;

comparing the captured formatted picture against a stored picture on a server that is formatted using same instructions sent to the user using the alternate channel;

flagging the captured image as correctly formatted and alternate authentication process as success when the comparison indicates that a match occurs;

flagging the captured image as incorrectly formatted and alternate authentication process as failure when the comparison indicates that a match does not occur;

alerting user via alert communication methods of user including email, text message, voice message, voice call, SMS, audible alarm, or visual clues; and logging the steps performed by the computing device.

13. The process of Claim 12, wherein the protected resource is a software application, software service, website, web service, data, hardware device, mobile app, smartphone app, physical area, physical item, bank account, trading account, credit limit, monetary balance, reward points, computer device, or communication device.

14. The process of Claim 12, wherein the picture provided to user to format is delivered using a different alternate channel including Email, SMS, text message, voice message, picture message, or video message.

15. The process of Claim 12, wherein formatting instructions delivered are encoded and decodable by the user having a decode key.

16. The process of Claim 12, wherein formatting instructions delivered are in the form of format instruction hints that the user has setup while configuring a set of formatting instructions for the process to choose randomly when the user makes access request.